(12) United States Patent  (10) Patent No.: US 7,443,845 B2
Gai et al.  (45) Date of Patent: Oct. 28, 2008

(54) APPARATUS AND METHOD FOR A LIGHTWEIGHT, RELIABLE, PACKET-BASED TRANSPORT PROTOCOL

(75) Inventors: Silvano Gai, San Jose, CA (US); Davide Bergamasco, Mountain View, CA (US); Claudio DeSanti, San Jose, CA (US); Dante Malagrino, Mountain View, CA (US); Fabio R. Maino, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1087 days.

(21) Appl. No.: 10/313,305

(22) Filed: Dec. 6, 2002

(65) Prior Publication Data

US 2004/0109443 A1    Jun. 10, 2004

(51) Int. Cl.
*H04L 12/28*    (2006.01)
*H04L 12/56*    (2006.01)

(52) U.S. Cl. .................... 370/389; 370/256; 370/402; 370/408

(58) Field of Classification Search ......... 370/389–394, 370/254–256, 401–408; 709/212–222, 232–235
See application file for complete search history.

(56) References Cited

U.S. PATENT DOCUMENTS 5,208,811 A * 5/1993 Kashio et al. ............... 370/401

(Continued)

FOREIGN PATENT DOCUMENTS

WO    WO 97/34431    9/1997

(Continued)

OTHER PUBLICATIONS

"Information technology—Telecommunications and information exchange between systems—Local and metropolitan area networks—Specific requirements—Part 2: Logical Link Control", International Standard ISO, ANSI/IEEE Std 802.2, 1998 edition.

(Continued)

*Primary Examiner*—Man Phan
(74) *Attorney, Agent, or Firm*—Weaver Austin Villeneuve & Sampson LLP

(57) ABSTRACT

A fast, lightweight, reliable, packet-based protocol that operates independent of the type of networking protocol used by the underlying physical layer of the network is disclosed. More specifically, the packet based protocol operates independently of or is capable of encapsulating physical layer protocols such as but not limited to MAC, Ethernet, Ethernet II, HARD or IP. The protocol defines at least three different types of frames including Information frames, Supervisory frames, and Unnumbered frames. In various embodiments of the invention, the Information, Supervisory, and Unnumbered frames include DSAP and SSAP field with semantics which are sufficiently large to support the various physical layer protocols that may be used on the network. The Information frames, Supervisory frames, and Unnumbered frames also have the ability to support urgent data delivery and certain memory management functions. The protocol is further capable of support the multiplexing of layers higher than the protocol so that multiple higher layer applications may share the same connection. Finally, the protocol of the present invention supports both flow control and congestion control, to help reduce the incidence of lost or dropped packets at a receiving node or over the network respectively.

32 Claims, 7 Drawing Sheets

U.S. PATENT DOCUMENTS

| | | | |
|---|---|---|---|
| 5,278,849 A | | 1/1994 | Hall |
| 5,394,402 A | * | 2/1995 | Ross .......................... 370/402 |
| 5,802,319 A | * | 9/1998 | Faulk et al. ................. 709/249 |
| 5,862,311 A | * | 1/1999 | Fujita ............................ 714/4 |
| 6,041,058 A | * | 3/2000 | Flanders et al. ............. 370/401 |
| 6,094,575 A | * | 7/2000 | Anderson et al. ........ 455/422.1 |
| 6,105,029 A | | 8/2000 | Maddalozzo et al. .......... 707/10 |
| 6,122,287 A | * | 9/2000 | Ohanian et al. ............. 370/465 |
| 6,188,694 B1 | * | 2/2001 | Fine et al. ................... 370/402 |
| 6,324,581 B1 | | 11/2001 | Xu et al. |
| 6,374,311 B1 | | 4/2002 | Mahany et al. |
| 6,401,127 B1 | * | 6/2002 | Lei et al. .................... 709/235 |
| 6,453,354 B1 | | 9/2002 | Jiang et al. |
| 6,515,967 B1 | | 2/2003 | Wei et al. .................... 370/244 |
| 6,667,954 B1 | | 12/2003 | Boduch et al. |
| 6,674,713 B1 | * | 1/2004 | Berg et al. .................. 370/217 |
| 6,674,742 B1 | * | 1/2004 | McDonald et al. .......... 370/351 |
| 6,700,871 B1 | | 3/2004 | Harper et al. |
| 6,772,215 B1 | * | 8/2004 | Rathonyi et al. ............ 709/230 |
| 6,831,898 B1 | | 12/2004 | Edsall et al. |
| 6,853,641 B2 | | 2/2005 | Lindhorst-Ko et al. |
| 6,857,012 B2 | | 2/2005 | Sim et al. .................... 709/222 |
| 6,873,603 B1 | * | 3/2005 | Ivaturi ........................ 370/255 |
| 6,937,576 B1 | * | 8/2005 | Di Benedetto et al. ...... 370/256 |
| 6,947,394 B1 | * | 9/2005 | Johansson et al. ........... 370/282 |
| 7,047,287 B2 | | 5/2006 | Sim et al. |
| 7,058,014 B2 | | 6/2006 | Sim ........................... 370/230 |
| 7,075,892 B2 | * | 7/2006 | Grover et al. ............... 370/238 |
| 7,126,923 B1 | * | 10/2006 | Yang et al. .................. 370/256 |
| 7,165,095 B2 | | 1/2007 | Sim |
| 7,216,159 B2 | * | 5/2007 | Hirose et al. ................ 709/223 |
| 7,280,488 B2 | * | 10/2007 | Shibasaki .................... 370/256 |
| 2002/0103846 A1 | | 8/2002 | Zisapel et al. ............... 709/105 |
| 2002/0150100 A1 | * | 10/2002 | White et al. ................. 370/392 |
| 2002/0156984 A1 | | 10/2002 | Padovano ................... 711/148 |
| 2003/0005145 A1 | * | 1/2003 | Bullard ....................... 709/238 |
| 2003/0067912 A1 | * | 4/2003 | Mead et al. ................. 370/389 |
| 2004/0062248 A1 | | 4/2004 | Nagarajan et al. |
| 2004/0081171 A1 | * | 4/2004 | Finn ...................... 370/395.53 |
| 2004/0139167 A1 | * | 7/2004 | Edsall et al. ................ 709/212 |
| 2004/0228339 A1 | * | 11/2004 | Gallo et al. ................. 370/379 |
| 2005/0210479 A1 | * | 9/2005 | Andjelic ..................... 719/321 |
| 2005/0223014 A1 | | 10/2005 | Sharma et al. ................ 707/10 |
| 2005/0259597 A1 | * | 11/2005 | Benedetto et al. ........... 370/254 |
| 2007/0038697 A1 | | 2/2007 | Zimran et al. |
| 2007/0088702 A1 | | 4/2007 | Fridella et al. |
| 2007/0174428 A1 | | 7/2007 | Lev Ran et al. |

FOREIGN PATENT DOCUMENTS

| | | |
|---|---|---|
| WO | WO01/67707 | 9/2001 |
| WO | WO02/08899 | 1/2002 |

OTHER PUBLICATIONS

"Quick Tutorials," www.pse.umass.edu/support/tuip.html, downloaded Apr. 14, 2004.

"Information Technology—Telecommunications and Information Exchange Between Systems—Local and Metropolitan Area Networks—Specific Requirements—Part 2: Logical Link Control," http://ieeexplore.ieee.org/ie14/5778/15425/00712972.pdf?isNumber=15425&prod=STD&arnumber=712972&arSt=&ared=&afAuthor=downloaded Apr. 14, 2004.

Field, James A., "Logical Link Control," Apr. 1986, Computers and Communications Integration Design, Analysis, Management, pp. 331-336.

Pujolle, G., "Les Reseaux, 3e Edition Mis A Jour," Feb. 2002, Editions Eyrolles, pp. 68-69.

International Search Report in corresponding PCT application PCT/US03/37123 mailed May 24, 2004.

Edsall et al. "Multiple Packet Paths to Improve Reliability in an IP Network", U.S. Appl. No. 09/593,566, filed Aug. 16, 2000.

International Search Report is corresponding PCT application PCT/US03/37234 mailed Dec. 16, 2004.

Peter J. Braam, "The Coda Distributed File System", www.coda.cs.cmu.edu/ljpaper/lj.html, Nov. 20, 2002.

Vinton G. Cerf and Robert E. Kahn, "A Protocol for Packet Network Intercommunication", IEEE Transactions on Communications, vol. Com-22, No. 5, May 1974.

RFC 793—Transmission Control Protocol DARPA Internet Program Protocol Specification (Sep. 1981, made available to the general public by the Internet Engineering Task Force at www.ietf.org).

M. O'Dell et al, "Extended Ethernet Frame Size Support, draft-kaplan-isis-ext-eth-02.txt", Network Working Group, Internet Draft, Expiration Date: Nov. 1999.

D. Farinacci, et al., Generic Routing Encapsulation (GRE), RFC 2784, Network Working Group, Request for Comments: 2784, Category: Standards Track, Mar. 2000.

U.S. Appl. No. 10/313,745, filed Dec. 6, 2002, Office Action mailed Jan. 19, 2007.

U.S. Appl. No. 10/313,745, filed Dec. 6, 2002, Final Office Action mailed Apr. 30, 2007.

U.S. Appl. No. 10/313,306, filed Dec. 6, 2002, Office Action mailed Jul. 3, 2006.

U.S. Appl. No. 10/313,306, filed Dec. 6, 2002, Final Office Action mailed Dec. 19, 2006.

U.S. Office Action dated Sep. 10, 2007 from related U.S. Appl. No. 11/129,100.

U.S. Office Action dated Nov. 26, 2007 from related U.S. Appl. No. 10/313,745.

International Search Report and Written Opinion dated Nov. 7, 2007 from related PCT Application No. PCT/US2006/018164, 8 pgs.

\* cited by examiner

| 0 | 8 | 16 | 24 | 32 | |
|---|---|---|---|---|---|
| Version | HLen | Type of Service | Total Length | | IP 72 |
| Identification | | Flags | Fragment Offset | | |
| Time To Live | Protocol Type= GRE | Header Checksum | | | |
| Source Address | | | | | |
| Destination Address | | | | | |
| C | Reserved | Vers | Ethernet Protocol Type = ABC1 | | GRE 76 |
| DSAP | | SSAP | | | ABC 74 |
| Control | | Flags | | | |
| Destination Port | | Source Port | | | |

Labels: 78, 80, 82, 84

FIG. 6A (70)

| 0 | 8 | 16 | 24 | 32 | |
|---|---|---|---|---|---|
| Version | HLen | Type of Service | Total Length | | IP 72 |
| Identification | | Flags | Fragment Offset | | |
| Time To Live | Protocol Type= GRE | Header Checksum | | | |
| Source Address | | | | | |
| Destination Address | | | | | |
| C | Reserved | Vers | Ethernet Protocol Type = ABC0 | | GRE 76 |
| Sequence Number 94 | | | | | HARD 92 |
| Source ID 96 | | Protocol Type = ABC1 98 | | | |
| DSAP 100 | | SSAP 102 | | | ABC 74 |
| Control | | Flags | | | |
| Destination Port | | Source Port | | | |

Labels: 78, 80, 82, 84

APPARATUS AND METHOD FOR A LIGHTWEIGHT, RELIABLE, PACKET-BASED TRANSPORT PROTOCOL

RELATED APPLICATIONS

The present invention is related to U.S. application Ser. No. 10/313,306 filed Dec. 6, 2002 entitled "A Scalable Network Attached Storage System" by Thomas Edsall et. al. and U.S. application Ser. No. 10/313,745 filed Dec. 6, 2002 entitled "Apparatus and Method for a High Availability Data Network Using Replicated Delivery" by Gai Silvano et. al., both filed on the same day and assigned to the same assignee as the present invention, and incorporated herein by reference for all purposes.

BACKGROUND OF THE INVENTION

1. Field of the Invention

The present invention relates to data networks, and more particularly, to a fast, lightweight, reliable, packet-based transport protocol that operates independent of the type of underlying protocol used by the network.

2. Background of the Invention

The most popular transport protocol in use today is the Transmission Control Protocol (TCP) defined in the framework of the Internet Protocol (IP) Suite. The TCP protocol provides upper protocol layers and/or applications with a reliable, connection-oriented, strictly in-order delivery, byte-stream transport service. TCP achieves reliability by means of an acknowledge-and-retransmission mechanism. Generally speaking, a receiving TCP entity acknowledges every packet it receives from the transmitting TCP entity. When one of such acknowledgments is not received within a certain period of time (called the Retransmission Timeout), the transmitting TCP entity assumes that the corresponding packet has been lost in the network and retransmits it. This retransmission mechanism has been improved over the years in order to make it more efficient. For example, an algorithm called Fast Retransmit has been added to TCP to trigger a retransmission of a missing packet well before a the retransmission timeout occurs. Also, the retransmission timeout has been made adaptive to the network size and load by adding an estimator of the round-trip-time, i.e., the time it takes for a TCP packet to reach its destination plus the time necessary for its acknowledgment to come back.

The TCP protocol also provides a flow control function, which is defined as the ability of the receiving node to control the rate at which packets are transmitted to it to prevent the overflow of its input buffer. To this end, TCP employs a flow control mechanism called sliding window. A receiving TCP entity continuously informs the transmitting TCP entity about the amount of free input buffer (the so called offered window). When this amount drops to zero, the transmitting TCP entity refrains from transmitting any further data to the receiving entity until new space becomes available in the input buffer.

Another important capability built into TCP is the congestion control function. It has already been noted that when a transmitting TCP entity does not receive an acknowledgment, it assumes the packet was dropped by the network. There are many reasons for which the network can drop a packet, e.g., data corruption, faulty links and/or network, buffer congestion, etc. Of all those reasons, congestion is the by far the most common, especially in large networks such as the Internet. Therefore, when an acknowledge goes missing, TCP not only assumes that a packet was dropped, it also assumes that the reason for this drop is network congestion. A number of algorithms such as Slow Start and Fast Recovery have been embedded into TCP in order to deal with congestion. The purpose of such algorithms is to throttle down the transmission rate in different ways depending on the severity of the congestion detected in the network.

One problem with TCP is that the three functions mentioned above, i.e., reliable delivery, flow control, and congestion control as well as other functionality make it an extremely complex protocol from the implementation standpoint. As a result, most network nodes typically implement TCP as a software module embedded in the operating system. Clearly this solution is not particularly fast and also consumes CPU cycles that could be used to run user applications. There are also a few TCP implementations that rely on micro-controller chips and special software (micro-code) to offload the system CPU from the task of running TCP. This solution is faster and more efficient than the previous one, but is still inadequate for high speed (i.e., multi gigabit per second) networks.

A fast, lightweight, reliable, packet-based protocol that operates independent of the type underlying protocol layer is therefore needed.

SUMMARY OF THE INVENTION

To achieve the foregoing, and in accordance with the purpose of the present invention, a fast, lightweight, reliable, packet-based transport protocol that operates independent of the type of the underlying protocols is disclosed. More specifically, this protocol, hereafter referred to as the ABC protocol, can be carried by protocols such as but not limited to IEEE 802.3, Ethernet, Ethernet II, HARD or IP. The ABC protocol defines at least three different types of frames including Information frames, Supervisory frames, and Unnumbered frames. In various embodiments of the invention, the Information, Supervisory, and Unnumbered frames include Destination Service Access Point (DSAP) and Source Service Access Point (SSAP) fields which are sufficiently large to support the various applications that may be used on the network. The Information frames, Supervisory frames, and Unnumbered frames also have the ability to support urgent data delivery and certain memory management functions. The ABC protocol is further capable of support the multiplexing of higher layer protocols so that multiple higher layer applications may share the same connection. Finally, the ABC protocol of the present invention supports both flow control and congestion control, to help reduce the incidence of lost or dropped packets at a receiving node or over the network.

BRIEF DESCRIPTION OF THE DRAWINGS

FIG. 6A illustrates the encapsulation of an ABC packet inside an IP datagram according to the present invention.

FIG. 6B illustrates the encapsulation of an ABC packet inside an HARD packet, in turn inside an IP datagram according to the present invention.

DETAILED DESCRIPTION OF THE PREFERRED EMBODIMENTS

Figure 1A:
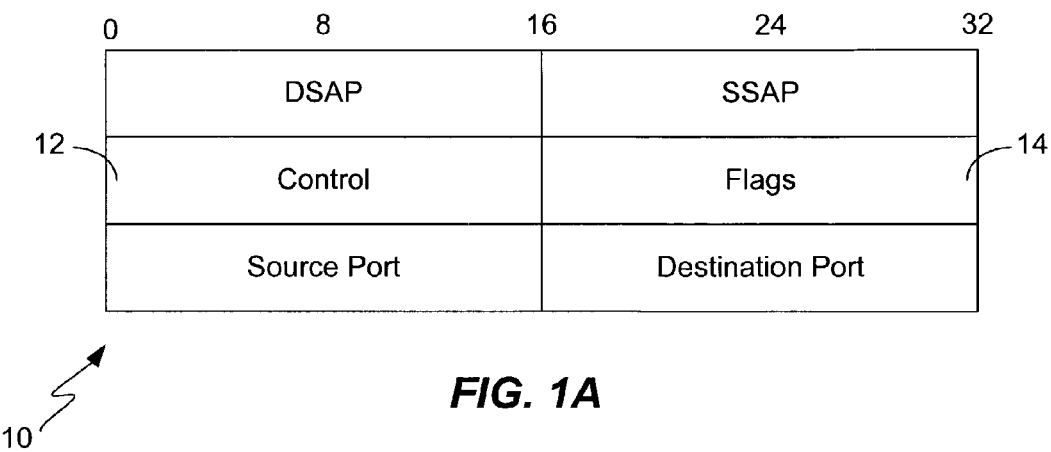
FIG. 1A is the header of an Information frame used by the ABC protocol of the present invention.

The fast, lightweight, reliable, packet-based transport protocol of the present invention, hereafter referred to as the ABC protocol, is a modification of the Logical Link Control-Part 2 (LLC-Type 2) protocol. More specifically, the ABC protocol of the present invention uses the state machine of the LLC Type 2 protocol without substantial modifications while modifying and extending certain aspects of LLC Type 2, as described here. For more information on the LLC-Type 2, see Part 2; logic Link Control, ANSI/IEEE Std. 802.2, 1998 Edition, incorporated in its entirety herein for all purposes.

Modifications to LLC-Type 2

The ABC protocol of the present invention modifies the LLC Type 2 protocol in three basic areas: addressing, flow and congestion control, and Out-of-Band signaling.

Each LLC-Type 2 Protocol Data Unit (PDU) contains two address fields, the Destination Service Access Point (DSAP) and the Source Service Address Point (SSAP). Each of these fields is eight bits wide and includes seven bits of actual address information. The least significant bit (LSB) in the DSAP field is used to identify the DSAP address as either an individual or a group address. The least significant eighth bit in the SSAP field is used to identify the LLC PDU as either a command or a response, and is therefore sometimes referred to as command/response identifier bit. The ABC protocol of the present invention extends the LLC-Type 2 addressing capabilities by having sixteen bit wide DSAP and SSAP fields. The semantic of the LSB for both fields remains the same as LLC-Type 2. The remaining fifteen bits, however, are now used for addressing purposes with the DSAP and SSAP fields respectively.

LLC-Type 2 relies on both the DSAP and SSAP fields in the LLC Type 2 header and the MAC source and destination addresses to identify a connection. Since the ABC protocol of the present invention operates independently of the underlying physical layer and can be used with almost any type of networking media, the semantics of the DSAP and SSAP fields have been slightly changed in such a way that connections are uniquely identified only by the DSAP and SSAP addresses. A media access control or MAC address is not needed with the present invention. This modification enables the ABC protocol of the present invention to be very flexible and allows it to run on any underlying layer such as IP or Ethernet without any major modifications.

LLC_Type 2 flow control is mainly intended for point-to-point links, while in ABC flow control is modified in order to work with an arbitrary number of links between a pair of ABC nodes. As far as congestion control is concerned, the most currently available LLC-Type2 specification includes an Annex, i.e., Annex C, which defines optional congestion control techniques for bridged LANs. The congestion control technique therein described seems to be inadequate to deal with severe congestion and penalizes substantially a connection from the bandwidth standpoint, especially if a network is large and the Round Trip Time (RTT) is considerable. ABC replaces the Annex C technique with a congestion control mechanism very similar to the one employed by the TCP protocol, which is widely known to be both effective and efficient. Flow control and congestion control are described in detail later in this application.

Finally, ABC requires the mandatory implementation of the XID and TEST frames for out-of-band signaling, as specified in the LLC-Type2 specification.

Extensions to LLC-Type 2

The ABC protocol extends the LLC-Type 2 protocol, by adding some extra functionality, in the following areas: memory management and segmentation, support for urgent data, and higher layer/application multiplexing.

As far as memory management is concerned, ABC allows a transmitting entity to signal a receiving entity that it needs to allocate a new buffer for data, through the NEW_BUFFER bit, or that a data unit has been completed and it can be delivered to the upper layer, through the END_OF_DATA bit.

ABC supports the delivery of urgent data to the destination ABC entity. When such an entity receives an Information frame marked urgent, the data contained in this frame is not buffered but immediately delivered to the upper layer protocol.

Finally, ABC allows multiple applications to share the same connection (i.e., having their packets sent using the same DSAP/SSAP pair. Application multiplexing is implemented in a way similar to TCP (Transmission Control Protocol) or UDP (User Datagram Protocol), i.e., by means of two 16-bit fields called Source Port and Destination Port.

ABC Frame Types

The ABC protocol of the present invention uses three different types of frames, similar to LLC-Type 2. The three types include Information frames, Supervisory frames and Unnumbered frames.

Referring to FIG. 1A, the header of an Information frame used by the ABC protocol of the present invention is shown. The Information frame header 10 includes a total of six fields, each sixteen bits wide. The six fields include a DSAP field, an SSAP field, a control field 12, a Flags field 14, and Source and Destination port fields respectively. The DSAP field identifies an ABC protocol connection at the destination node. The least significant bit is the Individual/Group bit as defined by the LLC-Type 2 specification. The remaining fifteen bits are used to identify the connection on the destination node. The SSAP field identifies the ABC protocol connection on the source node. The least significant bit is the Command/Response bit as defined by the LLC-Type 2 specification. The remaining fifteen bits are used to define the connection on the source code. Since fifteen bits in either the DSAP or the SSAP fields are used as connection identifiers, a maximum of $2^{15}=32768$ connections can be active at an ABC node. In another embodiment of the present invention, the concatenation of the upper fifteen bits of the DSAP and the upper fifteen bits of the SSAP can be used as a connection identifier to increase the maximum number of active connections, if needed. The DSAP and SSAP, fields are essentially the same as those defined by the LCC-Type 2 specification, except they are sixteen and not eight bits wide. The source Port field identifies the source application, while the Destination port field identifies the destination application.

Figure 1B:
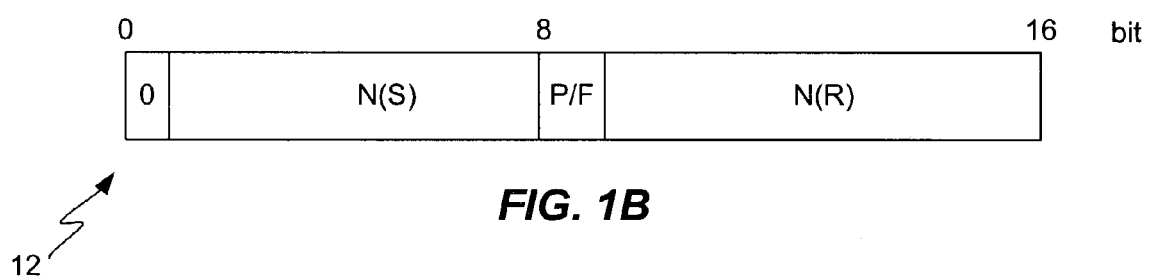
FIG. 1B is the format of the Control field of the Information frame header of FIG. 1A according to the present invention.

As illustrated in FIG. 1B, the control field of an Information Frame is used to hold sequence numbers and control information. The control field 12 has its most significant bit always set to zero (0) according to the preferred embodiment. The next seven bits represent the send sequence number N(S) of the sender. The first bit of the second byte is the Poll/Final bit as defined by the LLC-Type 2 specification. The remaining seven bits represent the receive sequence number N(R) of the sender.

Figure 1C:
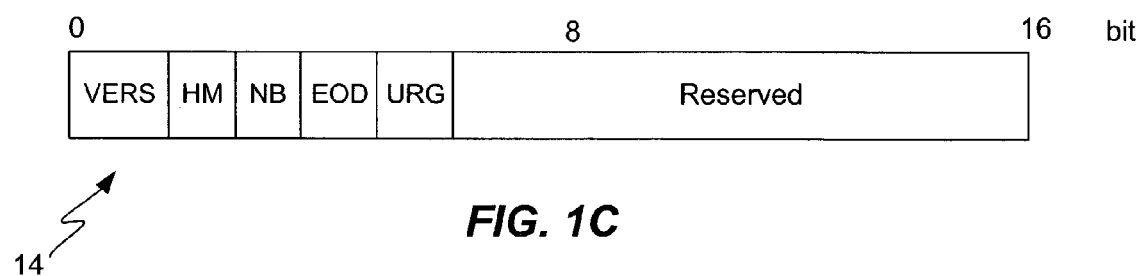
FIG. 1C is the format of the Flags field of the Information frame header of FIG. 1A according to the present invention.

In FIG. 1C, the various flags of the Flag field 14 are illustrated. These flags include from the most significant to the least significant bits, two bits to indicate the protocol version number (VERS), three memory management flags (HM, NB and EOD), and the urgent data flag (URG). The HM flag indicates if Hardware Memory management is supported or not. If this flag is set, the NB and EOD flags are considered valid. The New Buffer (NB) flag indicates that a new buffer must be allocated at the receiver to hold the data of the present and subsequent Information frames. The End of Data (EOD) flag indicates that this frame carries the last fragment of an upper layer data unit and, therefore, this data unit can be delivered and the buffer returned to the free pool. Finally, the urgent data flag (URG), when set, informs the receiving ABC entity that the data contained in this frame is urgent and must be delivered to the upper layer without being buffered. The remaining "Reserved" bits are available for the addition of new flags as needed.

Figure 2A:
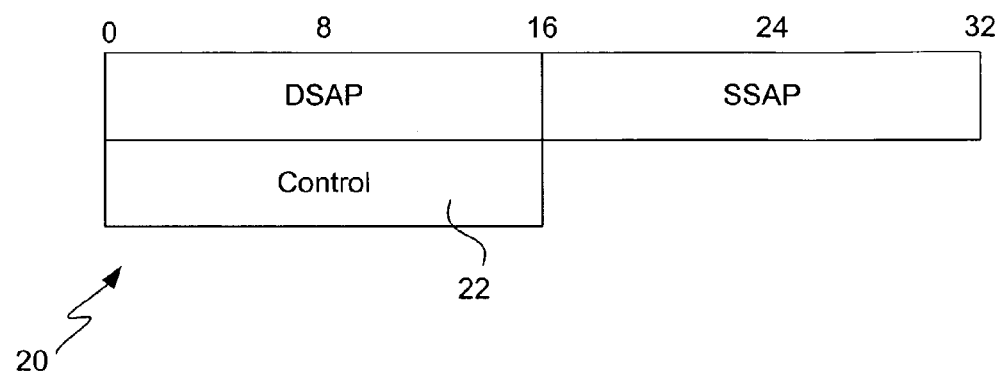
FIG. 2A illustrates the header of a Supervisory frame of the ABC protocol of the present invention.

Referring to FIG. 2A, the format of the header of a Supervisory frame of the ABC protocol of the present invention is shown. The Supervisory frame header 20 includes three fields, DSAP, SSAP and a Control field 22. The format of the header of a Supervisory frame 20 is essentially the same as the Supervisory frame of the LLC-Type 2 protocol, except the DSAP and SSAP fields are sixteen and not eight bits wide.

Figure 2B:
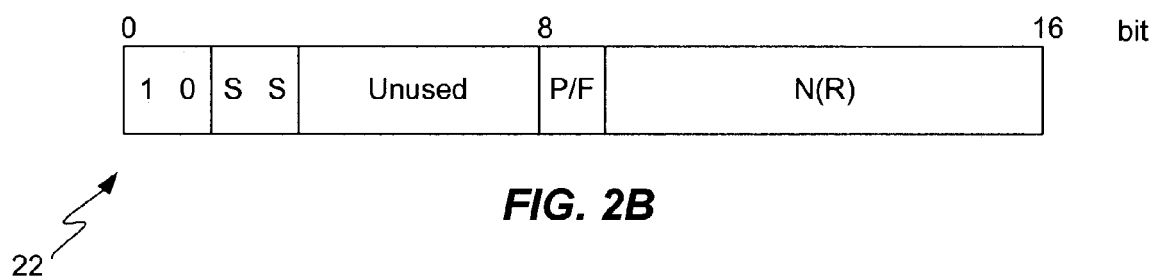
FIG. 2B is the format of the Control field of the Supervisory frame header of FIG. 2A according to the present invention.

In FIG. 2B, the Control field 22 is shown. The two most significant bits of the Control field 22 are set to, according to one embodiment, "10" for every Supervisory frame header 20. The next two bits (SS) identify the Supervisory frame type. The Supervisory frame types include Receiver Ready (RR) [SS=00], Receiver Not Ready (RNR) [SS=10], and Reject (RJT) [SS=01]. The next four bits are unused while the Poll/Final bit is at the same bit position as the Information frame. The seven least significant bits are used to represent the receive sequence number N(R) of the sender.

Figure 3A:
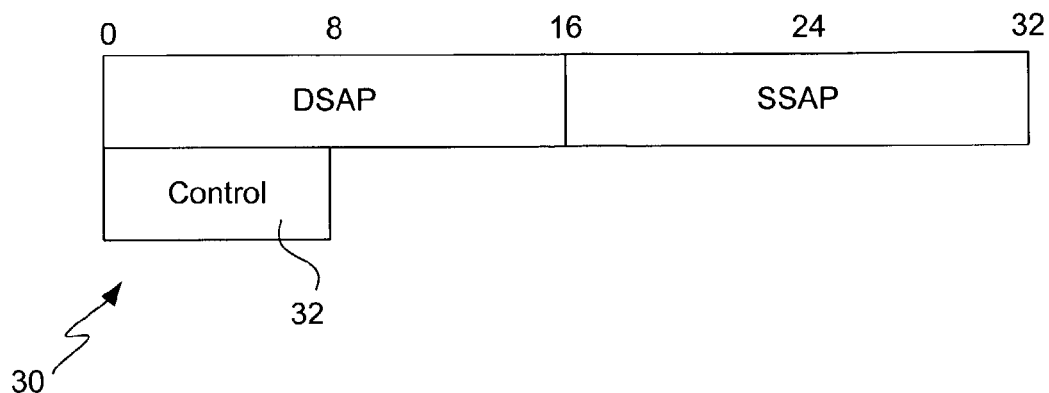
FIG. 3 illustrates the header of an Unnumbered frame used by the ABC protocol of the present invention.
FIG. 3B is the format of the Control field of the Unnumbered frame header of FIG. 3A according to the present invention.
FIG. 3C is the header of a XID frame used by the ABC protocol according to the present invention.
Figure 3B:
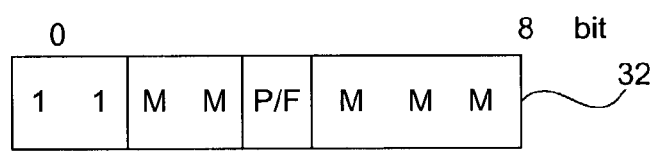

Referring to FIG. 3A, the header of an Unnumbered frame used by the ABC protocol of the present invention is shown. The Unnumbered frame header 30 is similar to the Supervisory frame header 20, except the control field 32 is only eight bits wide. As illustrated in FIG. 3B, the first two most significant bits are always set to "11" according to one embodiment, the fifth bit is the Poll/Find (P/F) bit, and all the remaining bits (M) specify the Unnumbered frame type. Table I below defines the unnumbered frames that are implemented with the ABC protocol of the present invention.

TABLE I

| Command/Response | Description | MMMMM |
|---|---|---|
| SABME Command | Set Asynchronous Balanced Mode Extended: used to initiate a connection | 11110 |
| DISC Command | Disconnect: used to terminate a connection | 00010 |
| UA Response | Unnumbered Acknowledgement: used to respond to SABME or DISC Command | 00110 |
| DM Response | Disconnect Mode: used to respond to non-SABME frames received when a connection is not yet started. | 11000 |
| FRMR Response | Frame Reject: used to Resume from Error Conditions. | 10001 |
| XID Command/Response | Exchange Identification: used to negotiate the window size | 11101 |
| Test Command/Response | Test: used to verify the status of a remote ABC station | 00111 |

Figure 3C:
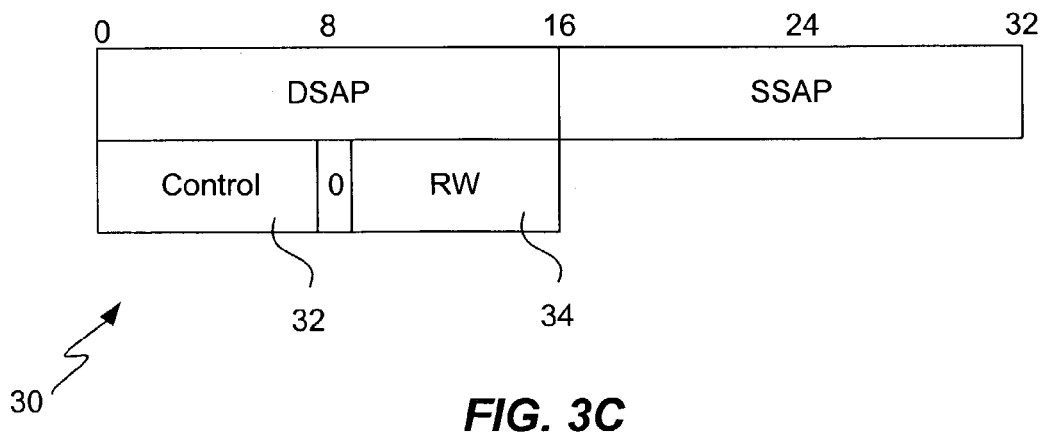

The XID Command/Response is used with the ABC protocol of the present invention only to communicate the receiver window size (RW). It therefore uses a simplified format compared to the LLC Type-2 version. With the LLC Type-2 version, every LLC protocol class supported by the sending entity must be listed. FIG. 3C illustrates the XID frame of the present invention. Following the Control field 32, there is an eight bit information field 34. The most significant bit is set to zero. The remaining seven bits convey the window size of the receiving entity (RW).

Encapsulation

The ABC protocol of the present invention operates independent of the type of underlying protocol. The ABC protocol can be used on top of Ethernet, Ethernet II, IP or HARD. For a more detailed explanation of HARD, see the aforementioned U.S. application Ser. No. 10/313,745 filed Dec. 6, 2002 entitled "Apparatus and Method for a High Availability Data Network Using Replicated Delivery" by Gai Silvano et. al.

Figure 4:
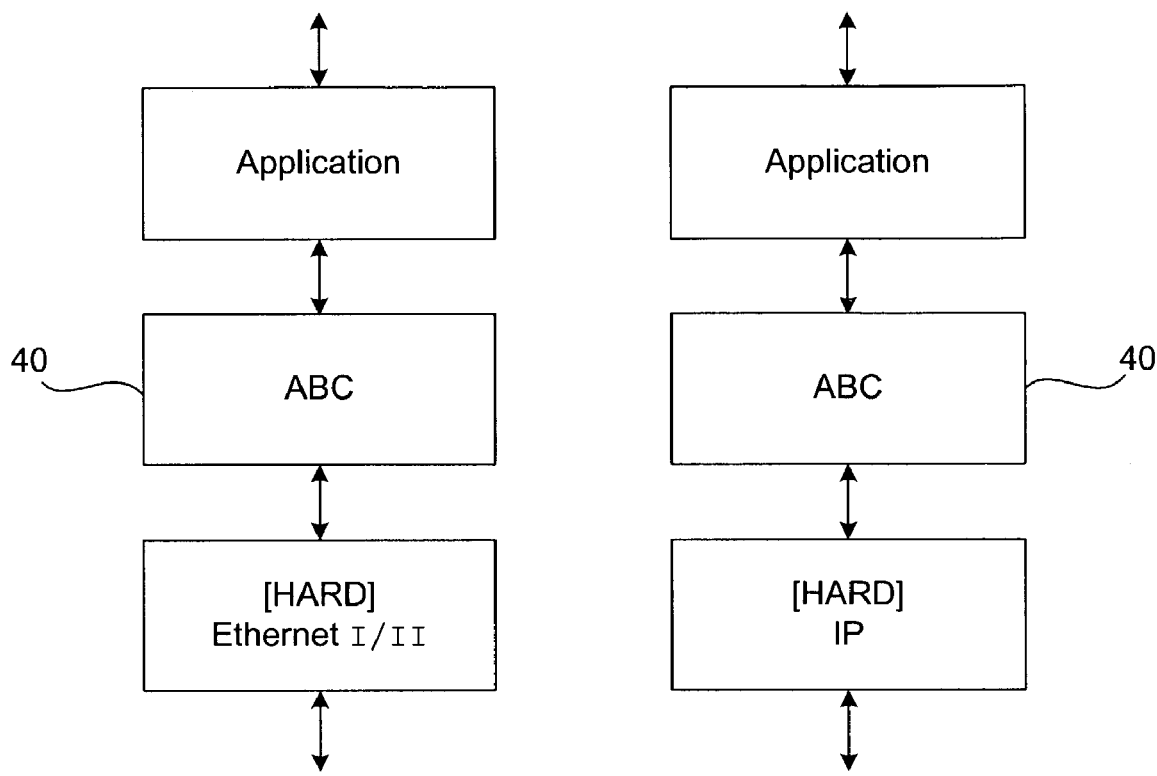
FIG. 4 is illustrates the ABC protocol of the present invention layered on top of r a MAC layer, IP layer of a HARD layer according to various embodiments of the present invention.

Referring to FIG. 4, the ABC protocol 40 of the present invention is shown deployed either over an Ethernet MAC layer or an IP layer with or without HARD in both cases. The encapsulation of the ABC protocol 40 of the present invention inside Ethernet/Ethernet II frames and IP datagrams, optionally using the high availability features of the HARD protocol are described below. The chief advantage of encapsulating the ABC protocol inside IP datagrams is the ability to make the ABC protocol routable. A disadvantage is that the hardware implementing the ABC protocol may have to deal with IP fragmentation.

Figure 5A:
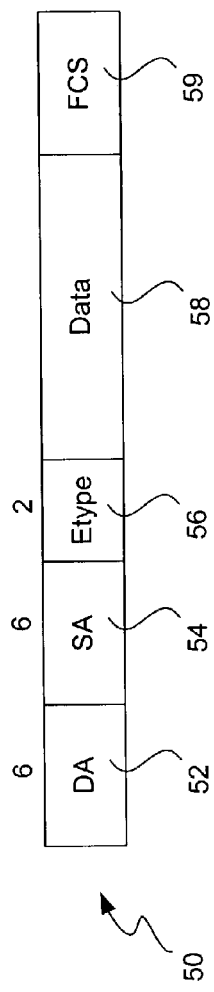
FIG. 5A illustrates an Ethernet II frame format.

Referring to FIG. 5A, an Ethernet (or Ethernet II) frame format is shown. The frame 50 includes a Destination Address (DA) field 52, a Source Address (SA) field 54, an Ethernet Type (Etype) field 56, a data field 58, and a Frame Check Sequence (FCS) field 59. In order to encapsulate ABC frames inside Ethernet frames, a new Ethernet type is needed to identify the ABC protocol data unit carried as an Ethernet Data field 50. In one embodiment, the value 0×ABC1 is used as an Ethernet type for ABC.

Figure 5B:
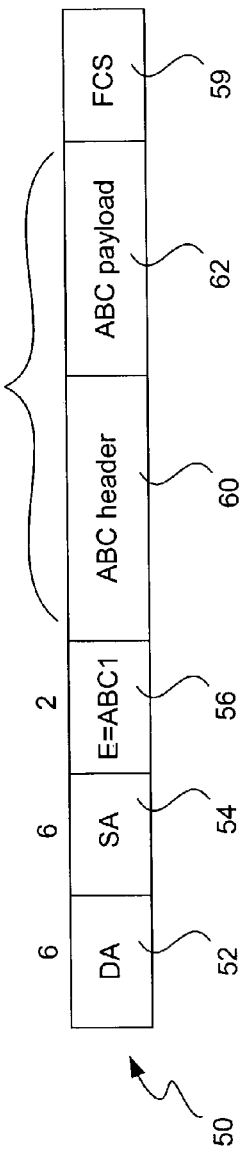
FIG. 5B illustrates the encapsulation of an ABC packet inside of an Ethernet II frame according to the present invention.

Referring to FIG. 5B, the encapsulation of an ABC frame inside an Ethernet frame 50 is shown. The E-type field 56 is set to 0×ABC1 to specify that the data field 58 is a ABC frame made of an ABC header 60 and a ABC payload 62 (the payload is not present if the ABC frame is a Supervisory or an Unnumbered frame).

Figure 5C:
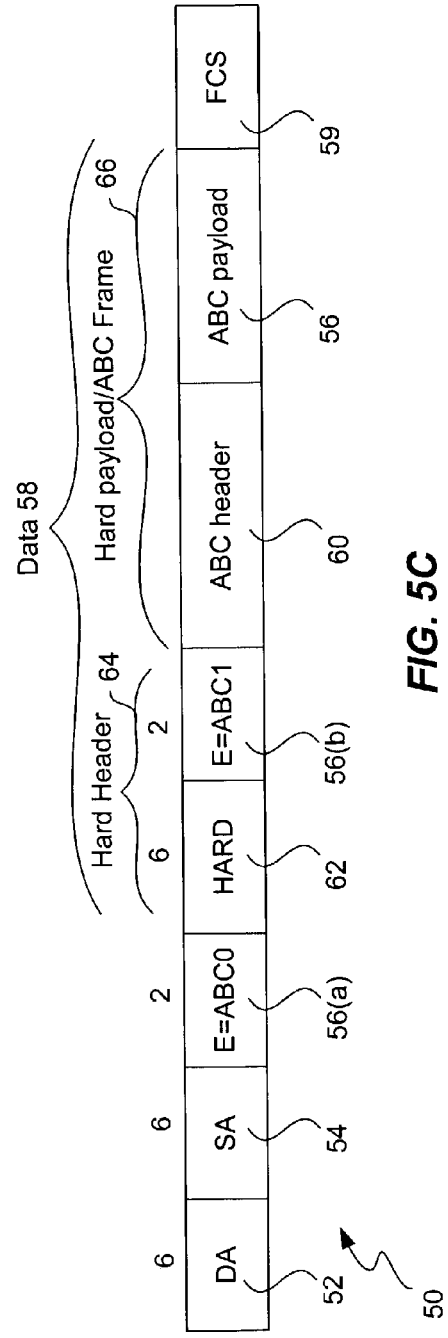
FIG. 5C illustrates the encapsulation of an ABC packet inside an HARD packet, in turn, inside an Ethernet II frame according to the present invention.

Referring to FIG. 5C, the encapsulation of an ABC frame inside a HARD frame inside an Ethernet frame 50 is shown. The E-type 56(*a*) is set to 0×ABC0 to indicate that the Ethernet Data field 58 is an HARD frame. The HARD header 64 contains an Ethernet type field 56(*b*) which has been set to 0×ABC1 to indicate that the HARD payload 66 is an ABC frame made of an ABC header 60 and a ABC payload 62.

Referring to FIG. 6A, the encapsulation of an ABC frame inside an IP datagram is shown. The datagram 70 includes an IP header 72, an ABC protocol header 74, and a Generic Routing Encapsulation (GRE) header 76 between the IP and ABC protocol headers. Since it is not possible to define an IP Protocol Type for ABC, the GRE header 76 has been included to indicate that a particular IP datagram is carrying an ABC frame. The GRE header 76 includes an Ethernet Protocol Type field 84 for holding the type of protocol to be carried inside an IP datagram. In this case, since the ABC protocol is being carried, the Ethernet Protocol Type field 84 is set to 0×ABC1.

Referring to FIG. 6B, the encapsulation of an ABC frame inside a HARD frame inside an IP datagram is shown. The IP datagram 90 includes an IP header 72, an ABC protocol header 74, a GRE header 76, and a HARD header 92. The HARD header includes a Sequence Number field 94, Source ID field 96, a Protocol Type field 98. In this case, the Ethernet Protocol Type field 84 of the GRE header 76 is set to 0×ABC0 to indicate that an HARD packet is encapsulated in the IP datagram. In turn, the Protocol Type field 98 of the HARD header 92 is set to 0×ABC1 to indicate that an ABC frame 74 is encapsulated in the HARD packet. For more information on HARD, see the aforementioned co-pending application Apparatus and Method for a High Availability Data Network Using Replicated Delivery", incorporated by reference herein.

ABC Protocol Operation

The ABC protocol operation is exactly the same as the LLC-Type 2 protocol described in Section XX of Part 2; Logical Link Control, ANSI/IEEE Std. 802.2, 1998 Edition.

Flow Control

Flow control is an end-to-end mechanism whose purpose is preventing packet drops at a receiving node due to buffer over-flow conditions caused by a fast transmitting node. ABC has two build-in flow control mechanisms: the sliding window typical of LLC-2 and a "stop-and-go" mechanism based on the Receiver Ready (RR) and Receiver Not Ready (RNR) Supervisory frames. The sliding window mechanism alone would often be insufficient in controlling the flow rate of a transmitting node. In fact, if frame acknowledgments are generated as soon as information frames are received, the transmitter is informed that more buffer space is available at the receiver, but actually it is not, at least until the application at the receiving node has removed data from the buffer. This situation could cause an over-flow condition at the buffer of the receiving node because the sending node will be allowed to send more Information frames as soon as it receives the acknowledgments.

Figure 7:
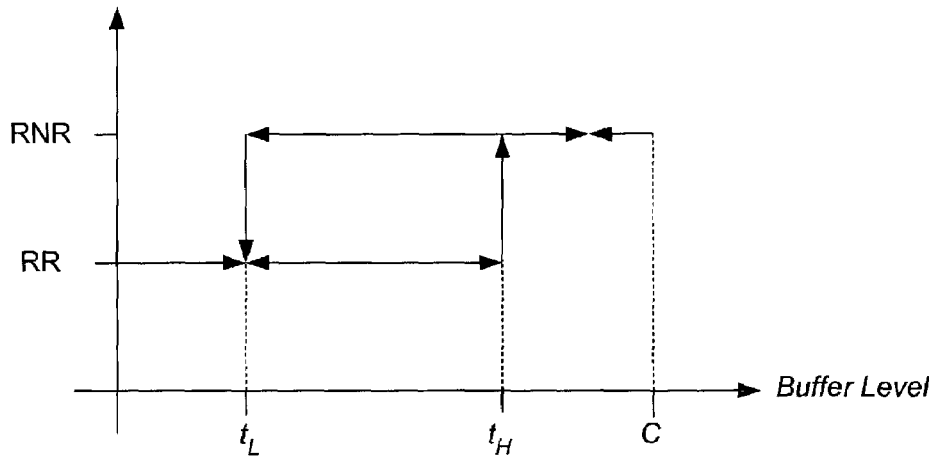
FIG. 7 is a diagram illustrating the cycle of the stop-and go flow control mechanism used by the ABC protocol of the present invention.

To avoid the aforementioned problem, the sliding window of the ABC protocol is integrated with the stop-and-go mechanism. Referring to FIG. 7, a diagram 120 illustrating the stop-and-go mechanism used by the ABC protocol is shown. The diagram 120 shows along the x-axis the buffer capacity, denoted by "C", a low level threshold $t_L$ and a high level threshold $t_H$. The RNR and RR frames are shown along the y-axis of the diagram. When the buffer level is below $t_L$, there is plenty of buffer space available and no flow control is exerted. As the usage of the increases, eventually the $t_H$ threshold is exceeded. When this occurs, a RNR Supervisory frame is issued to the transmitting node to stop it from transmitting. The $t_H$ threshold is set in accordance with one embodiment sufficiently below the buffer capacity C in order to preserve some buffer space for the packets potentially in transit after the RNR Supervisory frame is issued. As the consuming application at the receiving node empties the buffer, eventually the level of the buffer usage will fall below the $t_L$ threshold. At this point, a RR frame is issued to the transmitting node and the transmission of packets resumes. The diagram 120 thus defines a hysteresis cycle governed by the thresholds $t_H$ and $t_L$. This cycle prevents the system from oscillating between a transmit and quiet state, which would add significantly to the global overhead on the network due to the frequent transmission of RNR and RR Supervisory frames.

In another embodiment, the stop-and-go mechanism described above can be avoided provided that a simple change to the ABC protocol operation (as defined by the LLC-Type 2 operations) is made. The change consists in generating the acknowledgment frames only when the corresponding Information frames are removed from the buffer of the receiving node by the consuming application/upper layer protocol. In this way the availability of buffer space is announced to the transmitter only when new space is actually made available.

Congestion Control

When multiple traffic flows share the same link there is always a chance of congestion. Congestion happens when the sum of the bandwidths of each flow exceeds the capacity of the link. When congestion occurs, the buffer behind the link begins to fill up. Eventually, an overflow condition occurs as the capacity of the buffer is exceeded, resulting in the dropping of incoming packets. Packet drops are to be avoided as much as possible with the ABC protocol. Since ABC exploits a go-back-N retransmission scheme (i.e., all the frames transmitted after a frame whose acknowledgment is not received are retransmitted along with the missing packet), potentially every dropped frame can result in a full window of data being retransmitted, thus, exacerbating the congestion problem. To deal with congestion, the LLC-Type 2 protocol has been provided with a congestion control mechanism (see Annex C of the LLC-Type 2 specification), but such a mechanism seems to be both inadequate and inefficient. Therefore, the ABC protocol replaces the LLC-Type 2 mechanism with a more effective and efficient mechanism derived from TCP protocol congestion control techniques.

Each ABC transmitting node maintains per each connection four state variables: the current send window "snd_wnd", the congestion window "cwnd", the slow start threshold "ssthresh", and the acknowledgment frame count "ack_cnt". The send window is used, in association with the stop-and-go technique described above in relation to FIG. 7, to implement and end-to-end flow control mechanism. The purpose of the send window is to keep track of the number of frames that the receiver is able to accept at any given time. In contrast, the congestion window defines the maximum number of information frames a sender is allowed to send at any give time. Before transmitting any packet, an ABC transmitting node checks the two windows and selects the smaller of the two. The smaller value is the number of information frames that can be transmitted at that time.

Figure 8:
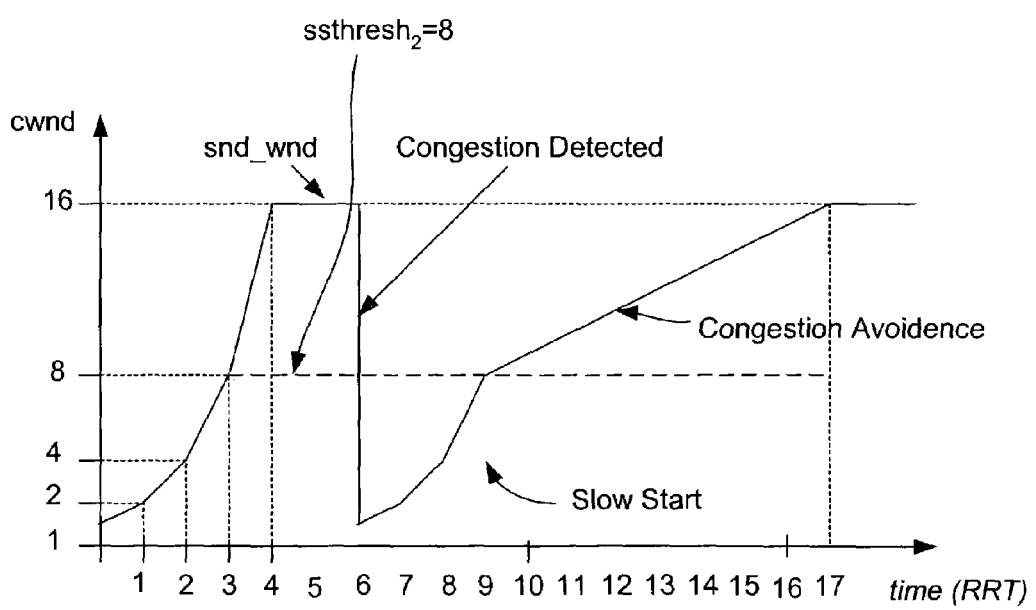
FIG. 8 is a diagram illustrating an ABC protocol congestion window evolution over time according to the present invention is shown.

Referring FIG. 8, an ABC congestion window diagram is shown. The y-axis represents the congestion window which is initialized at one (1). The x-axis represents time expressed in units of Round Trip Time (RTT). With each received acknowledgment frame, the congestion window cwnd is incremented by one. This implies that, under normal circumstances the congestion window grows over time as a power of two. This is clearly shown in FIG. 8, where, at every RTT the congestion window is incremented by one (1), two (2), four (4), eight (8) and sixteen (16). This process, referred to as slow start continues until the congestion window reaches the slow start threshold ssthresh, whose value has initially been set to the value of the send window. During the slow start phase, a transmitting node will quickly reach a state where the transmission of information frames is only governed by the end-to-end flow control, i.e., either by the send window or by the stop-and-go mechanism described earlier.

However, when a congestion condition is inferred by the sender upon receiving a REJ frame indicating that the receiver is missing one frame, the congestion window is instantly "shrunk" to its initial value (one), allowing the sender to send only one information frame. The slow start threshold is set to one half of the current window (which is the minimum of the congestion and the send window) but never smaller than two (in this case $ssthresh_2=8$). Thereafter, the congestion window is incremented again as acknowledgment frames are again received according to the slow start phase. However, this time the slow start threshold is only 8 frames, therefore the slow start phase lasts for only three RTTs. At this point the congestion avoidance phase starts, during which the congestion window is incremented by one for every RTT. This implies that during the congestion avoidance phase the congestion window increases linearly over time, as clearly shown in FIG. 8. To achieve this, during the congestion avoidance phase, the number of acknowledgment frames received is counted by the variable ack_cnt and, when it becomes equal to the congestion window, it means that one RTT has elapsed. The congestion window is incremented by one and the ack_cnt is reset to zero, to count the acknowledgments frames received during the next RTT. This process continues until either the congestion window becomes equal to the send window, or another congestion condition is detected.

In order to prevent multiple transmitters from synchronizing and start retransmission all at the same time (condition which is very likely to happen within a storage system such as that described in the above-identified co-pending application entitled "A Scalable Network Attached Storage System" where all transmitters observed almost the same RTT), a retransmission timer is used. As soon as congestion is detected, the retransmission timer is started and the transmitting node starts the retransmission procedure only after this timer has expired. The value of this timer is a random number picked in the range $[0, 2^N \times RTT]$, where RTT is the typical round trip time of a frame in the system, and N is the number of retransmission attempts for an information frame. The initial value for N is zero and is incremented every time a REJ Supervisory frame for the same sequence number is received. After a successful retransmission, or after receiving a REJ frame for another sequence number, N is cleared. This is an exponential retransmission back-off mechanism similar to one used by Ethernet, which is known to be effective in avoiding the synchronization of multiple transmitters.

The embodiments of the present invention described above are to be considered as illustrative and not restrictive. The invention is not to be limited to the details given herein, but may be modified within the scope and equivalents of the appended claims.

We claim:

1. A method, comprising:
   generating a first information frame having a Destination Service Access Point (DSAP) field that includes a DSAP identifying in a destination node, a Source Service Access Point (SSAP) field that includes a SSAP identifying a source node, a first destination port field identifying a first destination application, and a first source port field identifying a first source application;
   generating a second information frame having a DSAP field that includes the DSAP, a SSAP field that includes the SSAP, a second destination port field identifying a second destination application, and a second source port field identifying a second source application;
   receiving a supervisory frame including a Receiver Ready (RR) indicator;
   sending the first information frame and the second information frame to the destination node after receiving the supervisory frame including the Receiver Ready (RR) indicator, wherein the first information frame from the first source application and the second information frame from the second source application are multiplexed using the same DSAP and SSAP pair.

2. The method of claim 1, further comprising receiving a subsequent supervisory frame including a Receiver Not Ready (RNR) indicator, wherein the RNR indicator stops transmission to the destination node.

3. The method of claim 2, wherein the subsequent supervisory frame including the RNR indicator is sent when a buffer level at the destination node reaches buffer high threshold sufficiently below buffer capacity.

4. The method of claim 2, wherein the supervisory frame including the RR indicator is sent when a buffer level at the destination node falls below a low threshold sufficiently above zero.

5. The method of claim 1, wherein the first information frame further comprises a memory management sequence.

6. The method of claim 5, wherein the memory management sequence includes a New Buffer (NB) bit, an End of Data (LOD) bit, and an Urgent (URG) bit.

7. The method of claim 1, further comprising receiving an unnumbered frame.

8. The method of claim 7, wherein a control field in the unnumbered frame is operable to carry a command in a set of commands consisting of:
   a Set Asynchronous Balance Mode Extended (SABME) command;
   a Disconnect (DISC) command to disconnect a connection;
   An Unnumbered Acknowledgement (UA) response to answer a SABME or DISC command;
   a Disconnect Mode response to answer to a not SABME command when a connection has not yet started;
   a Frame Reject (FRMR) response for resuming operation after an error condition;
   an Exchange/Identification (XID) command/response to negotiate the window size of a receiving node in the network; and a TEST command/response to verify the status of a remote node in the network.

9. The method of claim 1, wherein the first information frame is encapsulated in an Ethernet frame.

10. The method of claim 9, wherein the Ethernet frame further includes a destination address field and a source address field separate from the DSAP field and the SSAP field.

11. The method of claim 1, wherein the first information frame is encapsulated in an Internet Protocol (IP) packet.

12. The method of claim 11, wherein the IP packet further includes a destination address field and a source address field separate from the DSAP field and the SSAP field.

13. A system, comprising:
a processor operable to generate a first information frame having a Destination Service Access Point (DSAP) field that identifies a DSAP identifying a destination node, a Source Service Access Point (SSAP) field that identifies a SSAP identifying a source node, a first destination port field identifying a first destination application, and a first source port field identifying a first source application and generate a second information frame having a DSAP field including the DSAP, a SSAP field including the SSAP, a second destination port field identifying a second destination application, and a second source port field identifying a second source application;
an interface operable to send the first information frame and the second information frame to the destination node after receiving a supervisory frame including a Receiver Ready (RR) indicator, wherein the first information frame from the first source application and the second information frame from the second source application are multiplexed using the same DSAP and SSAP pair.

14. The system of claim 13, wherein the first information frame is encapsulated in an Ethernet frame.

15. The system of claim 14, wherein the Ethernet frame further includes a destination address field and a source address field separate from the DSAP field and the SSAP field.

16. The system of claim 13, wherein the first information frame is encapsulated in an Internet Protocol (IP) packet.

17. The system of claim 16, wherein the IP packet further includes a destination address field and a source address field separate from the DSAP field and the SSAP field.

18. An apparatus, comprising:
means for generating a first information frame having a Destination Service Access Point (DSAP) field that includes a DSAP identifying a destination node, a Source Service Access Point (SSAP) field that includes a SSAP identifying a source node, a first destination port field identifying a first destination application, and a first source port field identifying a first source application;
means for generating a second information frame having the a DSAP field including the DSAP, a SSAP field including the SSAP, a second destination port field identifying second destination application, and a second source port field identifying a second source application;
means for receiving the supervisory frame including the Receiver Ready (RR) indicator
means for sending the first information frame and the second information frame to the destination node after receiving a supervisory frame including a Receiver Ready (RR) indicator, wherein the first information frame from the first source application and the second information frame from the second source application are multiplexed using the same DSAP and SSAP pair.

19. The apparatus of claim 18, further comprising means for receiving a subsequent supervisory frame including a Receiver Not Ready (RNR) indicator, wherein the RNR indicator stops transmission to the destination node.

20. The apparatus of claim 19, wherein the subsequent supervisory frame including the RNR indicator is sent when a buffer level at the destination node reaches buffer high threshold sufficiently below buffer capacity.

21. The apparatus of claim 19, wherein the supervisory frame including the RR indicator is sent when a buffer level at the destination node falls below a low threshold sufficiently above zero.

22. The apparatus of claim 18, wherein the first information frame further comprises a memory management sequence.

23. The apparatus of claim 22, wherein the memory management sequence includes a New Buffer (NB) bit, an End of Data (LOD) bit, and an Urgent (URG) bit.

24. The apparatus of claim 18, further comprising means for receiving an unnumbered frame.

25. The apparatus of claim 24, wherein a control field in the unnumbered frame is operable to carry a command in a set of commands consisting of:
a Set Asynchronous Balance Mode Extended (SABME) command;
a Disconnect (DISC) command to disconnect a connection;
An Unnumbered Acknowledgement (UA) response to answer a SABME or DISC command;
a Disconnect Mode response to answer to a not SABME command when a connection has not yet started;
a Frame Reject (FRMR) response for resuming operation after an enor condition;
an Exchange/Identification (XID) command/response to negotiate the window size of a receiving node in the network; and
a TEST command/response to verify the status of a remote node in the network.

26. The method as recited in claim 1, wherein the DSAP and SSAP fields are each sixteen bits long.

27. The method as recited in claim 26, wherein the fifteen most significant bits of both fields are used for addressing and wherein the least significant bit of both fields is used to indicate that contents of the fifteen most significant bits is either an individual or a group address.

28. The system as recited in claim 13, wherein the DSAP and SSAP fields are each sixteen bits long.

29. The system as recited in claim 28, wherein the fifteen most significant bits of both fields are used for addressing and wherein the least significant bit of both fields is used to indicate that contents of the fifteen most significant bits is either an individual or a group address.

30. The system as recited in claim 29, wherein the DSAP and SSAP pair together uniquely identify a connection.

31. The method as recited in claim 1, wherein the DSAP and SSAP pair together uniquely identify a connection.

32. The method as recited in claim 1, wherein the first information frame and the second information frame do not include a source MAC address or a destination MAC address.

* * * * *